Patented June 14, 1927.

1,632,485

UNITED STATES PATENT OFFICE.

ROBERT BURNS MacMULLIN, OF NIAGARA FALLS, NEW YORK, ASSIGNOR TO THE MATHIESON ALKALI WORKS, OF NEW YORK, N. Y., A CORPORATION OF VIRGINIA.

MANUFACTURE OF HYPOCHLORITES.

No Drawing. Application filed September 23, 1925. Serial No. 58,118.

This invention relates to improvements in the manufacture of hypochlorites such as calcium hypochlorite, and the invention includes improvements in processes of producing hypochlorites as well as improvements in certain novel steps of the process. The invention also includes certain novel hypochlorite products.

When chlorine reacts with an alkaline substance, such as lime, a part of the chlorine is converted into chloride and a part of the chlorine into hypochlorite. Commercial bleaching powder, for example, is a complex composition containing a part of its chlorine as chloride chlorine and a part of its chlorine in the form of hypochlorite chlorine. When bleaching powder is dissolved in water a solution containing calcium hypochlorite is formed, but calcium hypochlorite cannot be isolated by evaporation of such a solution as molecular compounds of calcium hypochlorite with calcium oxide and calcium chloride, originally present in the bleaching powder, again form. The presence of calcium chloride, which is inert as far as bleaching properties are concerned, is objectionable for the reason that it cuts down the effective bleaching value as compared with a product in which all of the chlorine is present in the form of hypochlorite chlorine. The presence of calcium chloride is further objectionable in that it decreases the stability of the bleaching powder.

In United States Letters Patent No. 1,481,039 there is described a method of producing substantially pure hypochlorites which involves the separation of hypochlorous acid from an aqueous solution containing hypochlorite chlorine and chloride chlorine by treatment with an intermediate compound which forms an extract of hypochlorous acid immiscible with the aqueous solution. The process of the present invention also involves the separation of hypochlorous acid from an aqueous solution containing chloride chlorine by treatment with an intermediate compound; and the present invention likewise provides a calcium hypochlorite product which is made up essentially of calcium hypochlorite with a minimum amount of impurities, the product being associated with a small quantity of free lime, but being substantially free from chloride or the complex molecular compounds found in bleaching powder.

According to the present invention, this calcium hypochlorite, and hypochlorites of alkali forming or base forming metals, the alkalies and alkali earths, are produced by a method which involves the separation of hypochlorous acid from aqueous solutions by treatment with tertiary alcohols and the subsequent treatment of the tertiary alkyl hypochlorites formed to produce metallic hypochlorites. The invention also includes certain novel steps for the production of intermediate products, and improvements in the recovery of metallic hypochlorites from alkyl hypochlorites as well as improvements in a cyclic process of a character hereinafter more fully set forth.

The complete process of the invention, as applied to the manufacture of calcium hypochlorite, comprises the following steps;— 1, the preparation of an equeous solution containing hypochlorous acid and containing chloride chlorine; 2, separation of hypochlorous acid from the aqueous solution in the form of a tertiary alkyl hypochlorite; 3, treatment of the separated tertiary alkyl hypochlorite with lime to form calcium hypochlorite. The third step may with particular advantage be carried out by treating the separated tertiary alkyl hypochlorite directly with lime in the presence of sufficient water to dissolve the calcium hypochlorite formed.

In carrying out the process of the present invention, the aqueous solution containing hypochlorous acid may be prepared by any known or suitable method, for example, by methods based upon the hydrolysis of chlorine according to the reaction

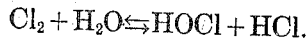

$$Cl_2 + H_2O \rightleftharpoons HOCl + HCl.$$

Hypochlorous acid may thus be made by adding chlorine to water in the presence of an alkaline substance, such as sodium bicarbonate or calcium carbonate, which reacts with the hydrochloric acid formed without reacting with the hypochlorous acid. Hypochlorous acid containing solutions may also be prepared by chlorination of solutions or suspensions containing alkaline substances such as sodium carbonate, sodium hydroxide, magnesium hydroxide, or hydrated lime.

A tertiary alcohol, such as tertiary butyl alcohol or tertiary amyl alcohol, is caused to react with the aqueous solution containing hypochlorous acid to form the corresponding tertiary alkyl hypochlorite. This reaction may be effected after preparation of the aqueous solution containing hypochlorous acid, or the chlorination of the aqueous solution and the formation of tertiary alkyl hypochlorite may be combined with advantage. The chlorination, or the last part of the chlorination, for example, may be carried out in the presence of the tertiary alcohol so that the hypochlorous acid combines with the alcohol as fast as it is formed, thereby preventing the concentration of hypochlorous acid from reaching any concentration which might tend to cause decomposition. By employing tertiary alcohols, a high chlorine efficiency and a high alcohol recovery can be obtained. The tertiary alkyl hypochlorites are also comparatively stable in storage when kept cool and in the dark.

In carrying out the process of the present invention, it is particularly advantageous to employ tertiary butyl alcohol, designated also as tertiary butanol. The tertiary butyl alcohol forms tertiary butyl hypochlorite with the hypochlorous acid in the aqueous solution, and this reaction product, being substantially insoluble in water or in the salt solutions formed by chlorination, floats on top of the aqueous layer. The aqueous layer and the tertiary butyl hypochlorite may be separated in any convenient or suitable manner. Other tertiary alcohols, such as tertiary amyl alcohol, are also useful in carrying out the process of the present invention. A mixture of tertiary alcohols, for example, a mixture containing tertiary butyl alcohol, a lesser amount of tertiary amyl alcohol and smaller amounts of other tertiary alcohols such as tertiary hexyl alcohol may also be employed with advantage. Mixtures of tertiary alcohols derived by treatment of the light olefines produced by cracking mineral oils, for example, may be used.

After separation of the tertiary alkyl hypochlorite from the aqueous layer, it is treated with an alkaline substance, such as lime, or other suitable metallic base to form the corresponding hypochlorite. The treatment may be carried out with an amount of alkaline substance sufficient to combine with all of the available hypochlorous acid or somewhat less, or with an excess of the alkaline substance to promote the completion of the reaction, in the presence of water. By properly regulating the addition of water the hypochlorite product may be recovered as a substantially dry solid product, or the hypochlorite product may be recovered in solution and the solution subjected to further treatment. The tertiary alcohol is regenerated and may be reused in the process.

In one particularly advantageous way of carrying out the treatment of the alkyl hypochlorite with an alkaline substance, the alkyl hypochlorite is separated from the aqueous solution and the alkaline substance is mixed directly therewith together with enough water to dissolve the metallic hypochlorite formed. In the production of calcium hypochlorite in this way, for example, an equivalent amount of hydrated lime may be mixed with the separated alkyl hypochlorite together with just enough water to produce about a 20% solution of calcium hypochlorite. The calcium hypochlorite product may be recovered by direct evaporation of this solution and drying of the product. This solution, however, may with advantage be treated under special conditions to recover substantially chemically pure calcium hypochlorite. The calcium hypochlorite solution referred to above is approximately saturated with calcium hypochlorite, and, by carrying out the evaporation under reduced pressures so that the temperature of the solution does not substantially exceed about 30° C. until about one half of the water is removed, pure crystals of a hydrate of calcium hypochlorite separate out and can be removed from the remaining solution. These crystals can then be dehydrated under conditions preventing decomposition. This mode of procedure is also useful in the recovery of other hypochlorites.

The production of calcium hypochlorite in accordance with the process of the present invention will be further illustrated by the following example: 179 lbs. of chlorine is passed with agitation into a mixture of 93 lbs. of hydrated lime, about 184 lbs. of tertiary butyl alcohol and about 560 lbs. of water while the temperature of the mixture is maintained below about 25° C. by cooling. The butyl hypochlorite formed separates as a floating layer of yellow insoluble oil having a specific gravity of about .96 and is separated from the aqueous layer. A chemically equivalent quantity of hydrated lime and enough water to produce a 20% solution of calcium hypochlorite is then mixed with the separated butyl hypochlorite while the temperature of the mixture is kept below about 25° C. by cooling. After the reaction is completed, insoluble impurities are filtered off. The butyl alcohol is regenerated by the reaction and undissolved alcohol may be separated from the aqueous solution at this point. The aqueous solution of calcium hypochlorite is then evaporated under reduced pressure so that the temperature of the solution does not exceed 30° C. During the first part of the evaporation any alcohol contained in the solution distills over, and, together with any previously separated alcohol, may be returned to the process. After about 50% of the water has been removed by evaporation, the solution is cooled to about 0° C. and the separated crystals of hydrated calcium hypochlorite are removed by filtration or centrifuging. The filtrate, containing the rest of the calcium hypochlorite together with soluble impurities such as small amounts of calcium chloride and calcium hydroxide, may be returned to the first step in the process. The separated crystals are dehydrated by drying in a current of dry air free from carbon dioxide at a temperature not exceeding about 35° or 40° C. The calcium hypochlorite product is substantially chemically pure calcium hypochlorite and is substantially free from calcium chloride and calcium hydroxide and contains more than 99% of available chlorine rendering it substantially equivalent, weight for weight, to the element chlorine itself. It is completely water soluble and contains nearly three times as much available chlorine as commercial bleaching powder. It is also harmless to handle and there are no shipping hazards.

In the foregoing example, a calcium hypochlorite product containing 85 to 90% calcium hypochlorite $Ca(OCl)_2$, may be obtained by direct evaporation of the approximately saturated calcium hypochlorite solution produced in the second step.

In place of the tertiary butyl alcohol described in the foregoing example, an equivalent amount of tertiary amyl alcohol or of a mixture of tertiary alcohols such as that described above may be used. As a further example: 71 lbs. of chlorine is passed with agitation into a mixture of 37 lbs. of hydrated lime, about 88 lbs. of tertiary amyl alcohol and about 500 lbs. of water while the temperature of the mixture is maintained below about 25° C. by cooling. The amyl hypochlorite formed separates as a floating layer of yellow insoluble oil having a specific gravity of about 0.85 and is separated from the aqueous layer. A chemically equivalent quantity of hydrated lime and enough water to produce a 20% solution of calcium hypochlorite is then mixed with the separated amyl hypochlorite while the temperature of the mixture is kept below about 25° C. by cooling. After the reaction is completed, insoluble impurities are filtered off. The amyl alcohol is regenerated by the reaction and undissolved alcohol may be separated from the aqueous solution at this point. The aqueous solution of calcium hypochlorite is then treated as described in the preceding example.

The process of the present invention has several important advantages in the production of hypochlorites. The process of the present invention may be carried out with a high chlorine and alcohol efficiency and also, may be carried out in relatively compact apparatus. The tertiary alcohols, particularly tertiary butyl alcohol and tertiary amyl alcohol, form alkyl hypochlorites which are very stable when dry and also in admixture with tertiary alcohol and water. Tertiary butyl alcohol and tertiary amyl alcohol are also relatively inert with respect to metallic hypochlorites such as calcium hypochlorite. Tertiary amyl alcohol and tertiary butyl alcohol likewise have relatively high boiling points, about 103° C. and 83° C. respectively, reducing evaporization losses and also reducing any health hazard due to the presence of fumes of the reagent employed. Tertiary butyl hypochlorite and tertiary amyl hypochlorite are also comparatively insoluble in water and in salt solutions such as solutions of calcium chloride. Somewhat higher chlorine and alcohol efficiency are apparently secured when employing tertiary butyl alcohol than when using tertiary amyl alcohol, and mixtures of tertiary alcohols in which butyl alcohol predominates also gives chlorine and alcohol efficiency apparently somewhat higher than amyl alcohol. Such mixtures appear to be particularly advantageous in that somewhat higher efficiencies are secured than would be indicated by the mean of the efficiencies of the separate components of the mixture, a mixture containing about ⅔ of tertiary butyl alcohol and about ⅓ of tertiary amyl alcohol giving an efficiency almost equal to the tertiary butyl alcohol.

Where the treatment of the alkyl hypochlorite is carried out in the presence of a solvent in which water is soluble, the process of the present invention has the advantage that the use of a solvent for the hypochlorite extract separated from the aqueous solution which will dissolve water materially assists in promoting the conversion of the hypochlorite extract to the desired metallic hypochlorite product. Where a solvent with which water is immiscible is employed, it is necessary, during the conversion treatment, to maintain the water in suspension in the solvent mixture, whereas in carrying out the present invention the water may be maintained present in solution in the solvent mixture where it is readily available for the conversion reaction. By employing a tertiary alcohol for the separation of the hypochlorous acid from the aqueous solution and by employing additional quantities of the same alcohol for solution of the separate alkyl hypochlorite, the alcohol may be recovered directly and reused in the process. While the use of a solvent in which water is insoluble is of special value and application in connection with the use of tertiary alcohols, this feature of the invention is of more general application to the recovery of hypochlorous acid as metallic hypochlorites from hypochlorous acid extracts such as are described in United States Letters Patent No. 1,481,039.

It will be apparent, however, that the process of the invention also includes a particularly advantageous mode of procedure in which only the alcohol required for reaction with the hypochlorous acid in the initial aqueous solution is employed and in which this alcohol is substantially completely recovered for reuse in the process. A further improvement in alcohol economy and efficiency is thus provided without sacrifice of the chlorine efficiency of the process or the quality of the product. This latter method of operation is, moreover, particularly advantageous for the subsequent production of hypochlorites of very high purity.

It will also be apparent that the invention provides an improved calcium hypochlorite product principally characterized by its high degree of purity. The stability of calcium hypochlorite is closely related to and dependent upon its purity. The present invention enables the production of a commercial product containing 85 to 90% of available chlorine, which product is much more stable and less deliquescent than ordinary bleaching powder. It also enables the production of substantially chemically pure calcium hypochlorite containing more than 99% available chlorine.

I claim:

1. The method of producing hypochlorites which comprises treating an aqueous solution containing hypochlorous acid with a tertiary alcohol, separating the tertiary alkyl hypochlorite formed from the aqueous solution, and causing the separated alkyl hypochlorite to react with an alkaline substance to form the corresponding hypochlorite.

2. The method of producing calcium hypochlorite which comprises treating an aqueous solution containing hypochlorous acid with tertiary butyl alcohol, separating the tertiary butyl hypochlorite formed from the aqueous solution, and treating the separated tertiary butyl hypochlorite with lime to form calcium hypochlorite.

3. The method of producing calcium hypochlorite which comprises treating an aqueous solution containing hypochlorous acid with a mixture of tertiary alcohols predominating in tertiary butyl alcohol, separating the tertiary alkyl hypochlorites formed from the aqueous solution, and treating the separated tertiary alkyl hypochlorites with lime to form calcium hypochlorite.

4. The method of producing hypochlorites which comprises forming a tertiary alkyl hypochlorite by reaction between a tertiary alcohol and an aqueous solution containing hypochlorous acid, separating the tertiary alkyl hypochlorite from the aqueous solution, and causing the separated tertiary alkyl hypochlorite to react with an alkaline substance to form the corresponding hypochlorite.

5. The method of producing hypochlorites which comprises treating an aqueous solution containing hypochlorous acid with a tertiary alcohol, separating the tertiary alkyl hypochlorite formed from the aqueous solution, and treating the separated alkyl hypochlorite with an alkaline substance in the presence of water to form the corresponding hypochlorite.

6. The method of producing hypochlorite which comprises treating an aqueous solution containing hypochlorous acid with a tertiary alcohol, separating the tertiary alkyl hypochlorite formed from the aqueous solution, and treating the separated alkyl hypochlorite with an alkaline substance in the presence of sufficient water to produce an aqueous solution of the metallic hypochlorite formed.

7. The method of producing calcium hypochlorite which comprises treating an aqueous solution containing hypochlorous acid with tertiary butyl alcohol, separating the tertiary butyl hypochlorite formed from the aqueous solution, and treating the separated tertiary butyl hypochlorite with lime in the presence of sufficient water to dissolve the calcium hypochlorite formed.

8. The method of producing calcium hypochlorite which comprises treating an aqueous solution containing hypochlorous acid with a mixture of tertiary alcohols predominating in tertiary butyl alcohol, separating the tertiary alkyl hypochlorites formed from the aqueous solution, and treating the separated tertiary alkyl hypochlorites with lime in the presence of sufficient water to dissolve the calcium hypochlorite formed.

9. The cyclic method of producing hypochlorites which comprises treating an aqueous solution containing hypochlorous acid with a tertiary alcohol, separating the tertiary alkyl hypochlorite formed from the aqueous solution, causing the separated alkyl hypochlorite to react with an alkaline substance to form the corresponding hypochlorite in the presence of sufficient water to dissolve the metallic hypochlorite formed, distilling the regenerated tertiary alcohol from the aqueous hypochlorite solution, and returning the distilled tertiary alcohol for the treatment of additional quantities of hypochlorous acid containing aqueous solution.

10. The cyclic method of producing hypochlorites which comprises treating an aqueous solution containing hypochlorous acid with a tertiary alcohol, separating the tertiary alkyl hypochlorite formed from the aqueous solution, causing the separated alkyl hypochlorite to react with an alkaline substance to form the corresponding hypochlorite, and returning the tertiary alcohol regenerated by treatment with the alkaline substance to the process for the treatment of additional quantities of aqueous solution containing hypochlorous acid.

11. The method of producing hypochlorites which comprises treating an aqueous solution containing hypochlorous acid with a tertiary alcohol, separating the tertiary alkyl hypochlorite formed from the aqueous solution, causing the separated alkyl hypochlorite to react with an alkaline substance to form the corresponding hypochlorite in the presence of sufficient water to dissolve the hypochlorite formed, evaporating the aqueous hypochlorite solution under reduced pressure, cooling the concentrated solution, and separating the metallic hypochlorite from the remaining solution.

12. The method of producing calcium hypochlorite which comprises treating an aqueous solution containing hypochlorous acid with tertiary butyl alcohol, separating the tertiary butyl hypochlorite formed from the aqueous solution, treating the separated tertiary butyl hypochlorite with lime in the presence of sufficient water to dissolve the calcium hypochlorite formed, separating insoluble material from the resulting aqueous solution, evaporating the solution after the separation under reduced pressure, cooling the evaporated solution, and separating the precipitated calcium hypochlorite therefrom.

13. The method of separating hypochlorous acid from aqueous solutions which comprises treating the solution with a mixture of tertiary alcohols predominating in tertiary butyl alcohol and separating the tertiary alkyl hypochlorite formed from the aqueous solution.

In testimony whereof I affix my signature.

ROBERT BURNS MacMULLIN.